(12) United States Patent
Heldreth

(10) Patent No.: US 11,666,921 B2
(45) Date of Patent: Jun. 6, 2023

(54) SYSTEMS AND METHODS FOR CRUSHING CLAY, TRANSPORTING CLAY, AND PROCESSING CLAY

(71) Applicant: U.S. MINING, INC., Partlow, VA (US)

(72) Inventor: Matthew O. Heldreth, Partlow, VA (US)

(73) Assignee: U.S. MINING, INC., Partlow, VA (US)

( * ) Notice: Subject to any disclaimer, the term of this patent is extended or adjusted under 35 U.S.C. 154(b) by 34 days.

(21) Appl. No.: 16/898,031

(22) Filed: Jun. 10, 2020

(65) Prior Publication Data
US 2020/0384477 A1 Dec. 10, 2020

Related U.S. Application Data

(60) Provisional application No. 62/881,841, filed on Aug. 1, 2019, provisional application No. 62/859,706, filed on Jun. 10, 2019.

(51) Int. Cl.
*B02C 13/02* (2006.01)
*B02C 13/30* (2006.01)
(Continued)

(52) U.S. Cl.
CPC ............. *B02C 13/02* (2013.01); *B02C 13/30* (2013.01); *C04B 33/13* (2013.01); *B02C 2013/28636* (2013.01)

(58) Field of Classification Search
CPC .... B02C 2013/286; B02C 2013/28609; B02C 2013/1871; B65G 21/02; B65G 21/06; C04B 33/13; Y02P 40/60
See application file for complete search history.

(56) References Cited

U.S. PATENT DOCUMENTS 46,936 A 3/1865 Peterson
288,895 A * 11/1883 Wallace
(Continued)

FOREIGN PATENT DOCUMENTS

CN 108745548 A * 11/2018
CN 108745548 A 11/2018
(Continued)

OTHER PUBLICATIONS

English translate (CN108745548A), retrieved date Nov. 23, 2021.*
(Continued)

*Primary Examiner* — Shelley M Self
*Assistant Examiner* — Mohammed S. Alawadi
(74) *Attorney, Agent, or Firm* — FisherBroyles, LLP; James J. Pohl

(57) ABSTRACT

Provided are methods and apparatus for crushing clay, transporting clay, and processing clay. In examples, provided are movable truss conveyor support apparatuses, movable crusher picker apparatuses, picker shaft rakes to clean picker shafts, adjustable hoppers, and tracked crushers. In an example, provided is a crusher including (i) a crusher frame, (ii) a crusher subframe movably suspended from the crusher frame, (ii) a rotary bearing fastened to the crusher subframe, (iv) a rotatable picker shaft rotatably supported by the rotary bearing and adapted to rotate relative to the crusher subframe, and (v) at least one picker fastened to the rotatable picker shaft.

33 Claims, 11 Drawing Sheets

(51) Int. Cl.
*C04B 33/13* (2006.01)
*B02C 13/286* (2006.01)

(56) References Cited

U.S. PATENT DOCUMENTS

| | | | | |
|---|---|---|---|---|
| 396,990 | A | * | 1/1889 | Dobler .................... B02C 23/04 241/31 |
| 1,636,585 | A | * | 7/1927 | Barker .................... B02C 17/02 241/51 |
| 2,642,174 | A | * | 6/1953 | Buccicone ......... B65G 21/2018 198/679 |
| 2,726,687 | A | | 12/1955 | McLachlan |
| 4,215,776 | A | * | 8/1980 | Esler ...................... B65G 15/62 198/823 |
| 5,255,860 | A | * | 10/1993 | Timmons ................. B02C 4/12 241/DIG. 31 |
| 5,975,443 | A | * | 11/1999 | Hundt .................... B02C 18/225 241/73 |
| 6,405,874 | B1 | * | 6/2002 | Douglas ................. B02C 21/02 209/241 |
| 2004/0050986 | A1 | * | 3/2004 | Rossi, Jr. ................. B02C 1/10 241/101.73 |
| 2005/0017100 | A1 | | 1/2005 | Johnson et al. |
| 2007/0108025 | A1 | * | 5/2007 | Boudreau .............. B65G 15/62 198/818 |
| 2015/0130256 | A1 | | 5/2015 | Liu |
| 2017/0151572 | A1 | | 6/2017 | Dallimore et al. |
| 2018/0243746 | A1 | * | 8/2018 | Udy .......................... B30B 3/04 |
| 2022/0226831 | A1 | * | 7/2022 | Reznitchenko ........... B02C 4/02 |
| 2022/0234049 | A1 | * | 7/2022 | Reznitchenko ........... B02C 4/32 |

FOREIGN PATENT DOCUMENTS

| | | |
|---|---|---|
| CN | 209005897 U | 6/2019 |
| JP | H0729064 B2 * | 5/1995 |
| JP | 4879415 B2 * | 2/2012 |

OTHER PUBLICATIONS

English translate (JP4879415B2), retrieved date Nov. 23, 2021.*
English translate (JPH0729064B2), retrieved date Nov. 24, 2021.*
International Search Report and Written Opinion issued in PCT/US2020/037005 dated Sep. 2, 2020 (7 pages).

* cited by examiner

Picker Shaft Rake 330

Version one — Plan view

Version two — Plan view

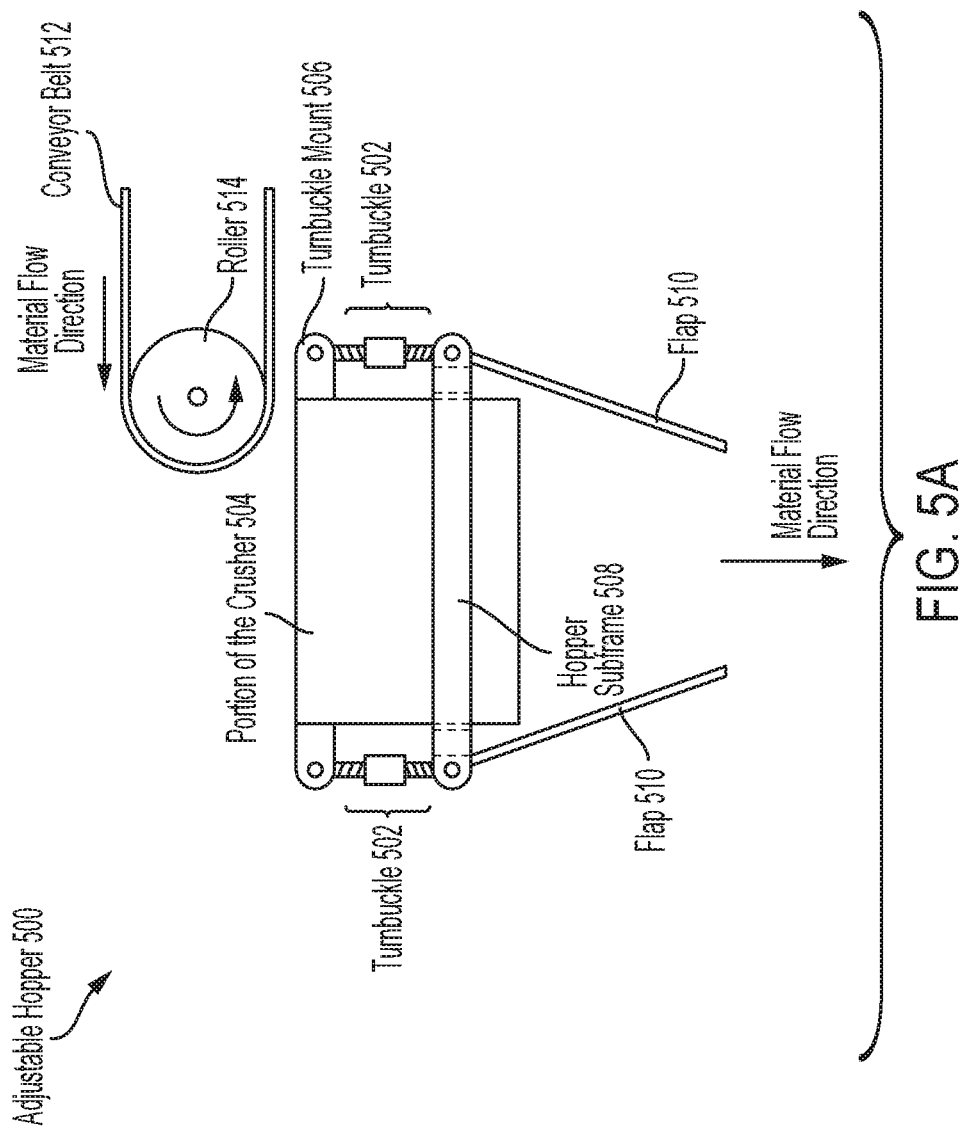

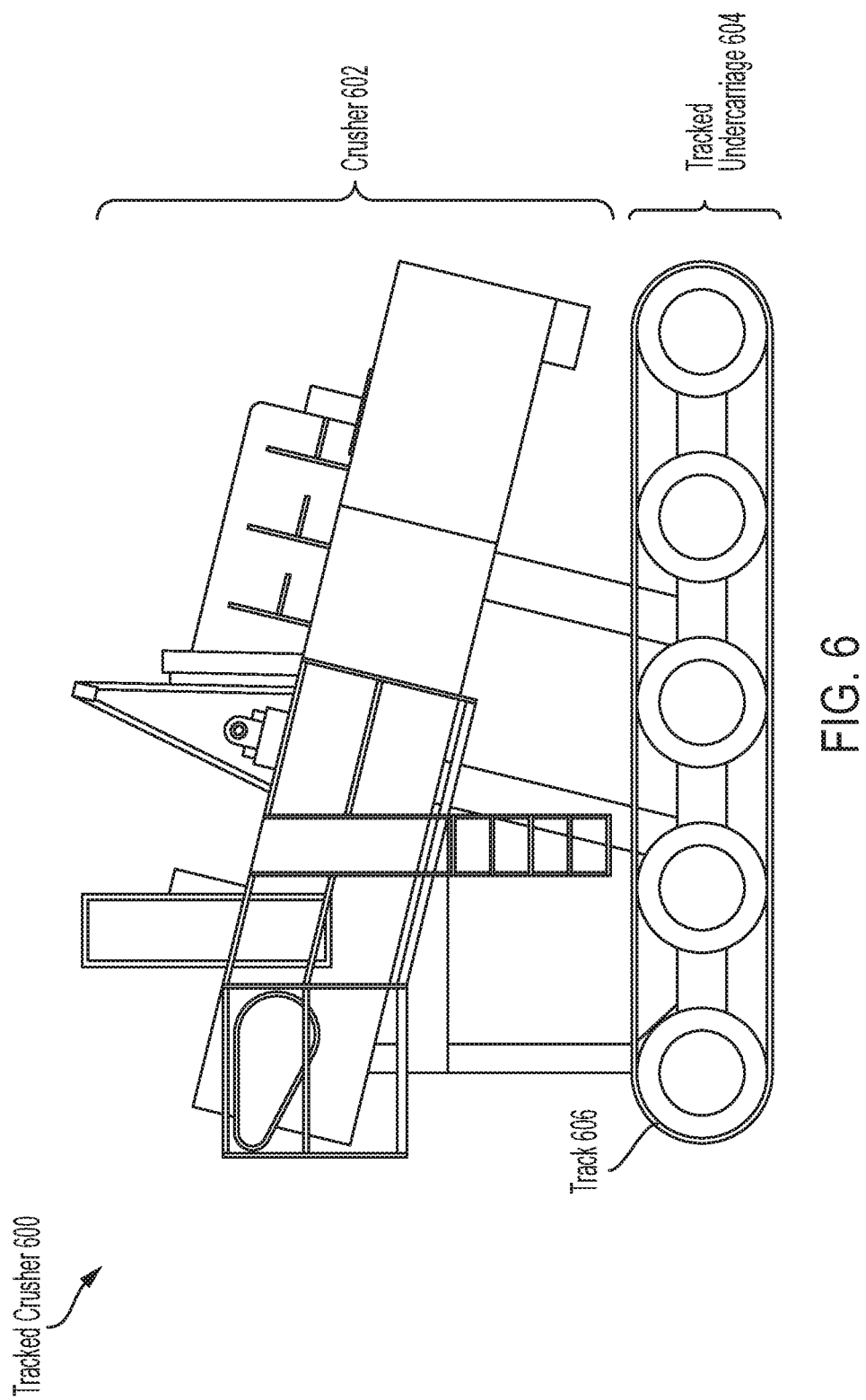

SYSTEMS AND METHODS FOR CRUSHING CLAY, TRANSPORTING CLAY, AND PROCESSING CLAY

CROSS REFERENCE TO RELATED APPLICATIONS

This Non-Provisional patent application claims the benefits of U.S. Provisional Application No. 62/859,706 titled "SYSTEMS AND METHODS FOR PROCESSING CLAY", filed Jun. 10, 2019, and U.S. Provisional Patent Application No. 62/881,841 titled "SYSTEMS AND METHODS FOR CRUSHING CLAY, TRANSPORTING CLAY, AND PROCESSING CLAY", filed Aug. 1, 2019, the disclosures of which are incorporated herein, in their entireties, by reference.

BACKGROUND

Over many thousands of years, humans have found numerous uses for different types of clay, leading to many types of clay having great value to industry. As examples, clay is used in catalysts, ion exchangers, fire retardants, pots, bricks, floor tiles, drilling mud, foundry sand, soil additives, desiccants, landfill liners, pond liners, cosmetics, and cat litter. These many uses result from characteristics of different types of clays, such as tendencies to clump, tendencies to swell, chemical resistance and stability, and tendencies to absorb liquids. These characteristics result from the chemical and physical structure of the different types of clays.

One type of clay is montmorillonite (MMT). MMT is in the smectite group of clay and is a naturally-occurring inorganic clay. MMT is a sheet silicate comprised of many flat tetrahedral layers (i.e., plates, sheets) of silica. The layers are held together by Van Der Waal bonds and metal atoms such as aluminum (i.e., an aluminum octahedral sheet), potassium, magnesium, and/or other free metallic ions.

MMT can absorb water molecules into interlayer regions. As a result of water absorption, many physical effects result, depending on the concentration of water absorbed by the MMT. For example, when a small quantity of water is introduced to a relatively large quantity of MMT, the water can form thin films between the silica layers and the MMT can swell, can clump, and can become tacky (i.e., sticky). When additional water is introduced, the thin films of water thicken, the MMT continues to swell, and the MMT can become slippery.

The physical effects of water addition to MMT can lead to a hazardous MMT mining environment, particularly in surface mines due to impracticality of protecting large areas of the mines from rainfall and surface waters. Rain and surface waters can add varying amounts of water to unmined surfaces comprising MMT, which can lead to stickiness and/or slipperiness of pit bottoms, pit benches, access roads, ramps, and other mine surfaces comprising MMT. This results in mining equipment becoming difficult to move relative to the surfaces of the mine. Further, mined MMT that is hydrated can stick to both stationary and moving surfaces of mining equipment, such as MMT-moving equipment buckets, MMT-moving equipment blades, MMT crushers, and MMT conveying equipment. This can result in degraded effectiveness of the equipment due to clogging and clumping of MMT on stationary surfaces and/or moving surfaces of the equipment.

Accordingly, there are previously unaddressed and long-felt industry needs for methods and apparatus which improve upon conventional methods and apparatus.

SUMMARY

This summary provides a basic understanding of some aspects of the present teachings. This summary is not exhaustive in detail, and is neither intended to identify all critical features, nor intended to limit the scope of the claims.

Example methods and apparatus for crushing clay, transporting clay, and processing clay are provided. In some examples, provided are conveyor support apparatus configured to support ends of truss conveyor sections during stationary operations, when the truss conveyors are being moved over montmorillonite (MMT), or both. In some examples, provided are improved MMT crushers.

In some examples, a crusher can include (i) a crusher frame, (ii) a crusher subframe movably suspended from the crusher frame via a length-adjustable turnbuckle, (iii) a rotary bearing fastened to the crusher subframe, (iv) a rotatable picker shaft rotatably supported by the rotary bearing and adapted to rotate relative to the crusher subframe, and (iv) at least one picker fastened to the rotatable picker shaft.

In some examples, the crusher can include at least one actuator, leadscrew and nut, jackscrew, ball screw, roller screw, pneumatic cylinder, hydraulic cylinder, hoist, winch, or rack and pinion, where the at least one actuator, leadscrew and nut, jackscrew, ball screw, roller screw, pneumatic cylinder, hydraulic cylinder, hoist, winch, or rack and pinion is adapted to movably suspend the crusher subframe from the crusher frame.

In some embodiments, the crusher can include at least one electric motor, pneumatic motor, hydraulic motor, or engine, where the at least one electric motor, pneumatic motor, hydraulic motor, or engine is rotatably coupled to the at least one leadscrew, jackscrew, ball screw, roller screw, hoist, winch, or pinion and/or adapted to rotate the at least one leadscrew, jackscrew, ball screw, roller screw, hoist, winch, or pinion.

In some examples, the crusher can include a turnbuckle mount rigidly mounted to the crusher frame and a mechanical articulating joint, where a threaded portion of the length-adjustable turnbuckle is movably mounted to the turnbuckle mount via the mechanical articulating joint.

In some embodiments, the crusher can include (i) a turnbuckle mount rigidly mounted to the crusher subframe and (ii) a mechanical articulating joint, where a threaded portion of the length-adjustable turnbuckle is movably mounted to the turnbuckle mount via the mechanical articulating joint.

In some examples, the crusher can include (i) a turnbuckle mount rigidly mounted to the crusher frame and (ii) a rotary bearing, where a threaded portion of the length-adjustable turnbuckle is movably mounted to the turnbuckle mount via the rotary bearing.

In some examples, the crusher can include (i) a turnbuckle mount rigidly mounted to the crusher subframe and (ii) a rotary bearing, where a threaded portion of the length-adjustable turnbuckle is movably mounted to the turnbuckle mount via the rotary bearing.

In some examples, the length-adjustable turnbuckle is mounted non-orthogonally relative to at least one of the crusher frame or the crusher subframe. In an example, the length-adjustable turnbuckle can be mounted non-orthogonally relative to at least one additional length-adjustable turnbuckle that suspends the crusher subframe from the crusher frame. In an example, the length-adjustable turnbuckle can be mounted non-orthogonally relative to at least one link that suspends the crusher subframe from the crusher frame. In an example, the length-adjustable turnbuckle can be mounted non-orthogonally relative to at least one actuator, leadscrew and nut, jackscrew, ball screw, roller screw, pneumatic cylinder, hydraulic cylinder, hoist, winch, or rack and pinion that suspends the crusher subframe from the crusher frame. Suspending the crusher frame using non-orthogonal suspension components and/or locating links can positively locate the crusher subframe relative to the crusher frame.

In some embodiments, the crusher can include a fixed-length link adapted to suspend the crusher subframe from the crusher frame, where a first portion of the fixed-length link is rigidly mounted to the crusher frame and a second portion of the fixed-length link is mounted to the crusher subframe via at least one of a mechanical articulating joint or a roller bearing.

In some examples, the crusher can include a fixed-length link adapted to suspend the crusher subframe from the crusher frame, where a first portion of the fixed-length link is rigidly mounted to the crusher subframe and a second portion of the fixed-length link is mounted to the crusher frame via at least one of a mechanical articulating joint or a roller bearing.

In some examples, the crusher can include a fixed-length link adapted to suspend the crusher subframe from the crusher frame, where a first portion of the fixed-length link is mounted to the crusher subframe via a first movable joint (e.g., at least one of a mechanical articulating joint or a roller bearing) and a second portion of the fixed-length link is mounted to the crusher frame via a second movable joint (e.g., at least one of a mechanical articulating joint or a roller bearing).

In some examples, a crusher can include (i) a crusher frame, (ii) a rotary bearing fastened to the crusher frame, (iii) a rotatable picker shaft rotatably supported by the rotary bearing and adapted to rotate relative to the crusher frame, (iv) at least one picker fastened to the rotatable picker shaft, and (v) a picker shaft rake having a mounting portion and a pad, where the mounting portion is removably fastened to the crusher frame and the pad is located substantially near a rotatable surface of the rotatable picker shaft. In some examples, two or more pickers are fastened to the rotatable picker shaft and the pad is located between the two or more pickers. In some examples, the pad has at least one of a scraping edge and a chamfered edge.

In some examples, a crusher can include (i) a crusher subframe, (ii) a rotary bearing fastened to the crusher subframe, (iii) a rotatable picker shaft rotatably supported by the rotary bearing and adapted to rotate relative to the crusher subframe, (iv) at least one picker fastened to the rotatable picker shaft, and (v) a picker shaft rake having a mounting portion and a pad, where the mounting portion is removably fastened to the crusher subframe and the pad is located substantially near a rotatable surface of the rotatable picker shaft.

In some embodiments, a crusher can include a crusher frame, (i) a hopper subframe movably suspended from the crusher frame via a length-adjustable turnbuckle, and (iii) a flap fastened to the hopper subframe.

In some examples, the crusher can include at least one actuator, leadscrew and nut, jackscrew, ball screw, roller screw, pneumatic cylinder, hydraulic cylinder, hoist, winch, or rack and pinion, where the at least one actuator, leadscrew and nut, jackscrew, ball screw, roller screw, pneumatic cylinder, hydraulic cylinder, hoist, winch, or rack and pinion is adapted to movably suspend the hopper subframe from the crusher frame.

In some embodiments, the crusher can include at least one electric motor, pneumatic motor, hydraulic motor, or engine, where the at least one electric motor, pneumatic motor, hydraulic motor, or engine is rotatably coupled to the at least one leadscrew, jackscrew, ball screw, roller screw, hoist, winch, or pinion and/or adapted to rotate the at least one leadscrew, jackscrew, ball screw, roller screw, hoist, winch, or pinion.

In some examples, the crusher can include (i) a turnbuckle mount rigidly mounted to the crusher frame and (ii) a mechanical articulating joint, where a threaded portion of the length-adjustable turnbuckle is movably mounted to the turnbuckle mount via the mechanical articulating joint.

In some examples, the crusher can include (i) a turnbuckle mount rigidly mounted to the hopper subframe and (ii) a mechanical articulating joint, where a threaded portion of the length-adjustable turnbuckle is movably mounted to the turnbuckle mount via the mechanical articulating joint.

In some examples, the crusher can include (i) a turnbuckle mount rigidly mounted to the crusher frame and (ii) a rotary bearing, where a threaded portion of the length-adjustable turnbuckle is movably mounted to the turnbuckle mount via the rotary bearing.

In some examples, the crusher can include (i) a turnbuckle mount rigidly mounted to the hopper subframe and (ii) a rotary bearing, where a threaded portion of the length-adjustable turnbuckle is movably mounted to the turnbuckle mount via the rotary bearing.

In some embodiments, the length-adjustable turnbuckle can be mounted non-orthogonally relative to at least one of the crusher frame or the hopper subframe. In an example, the length-adjustable turnbuckle can be mounted non-orthogonally relative to at least one additional length-adjustable turnbuckle that suspends the hopper subframe from the crusher frame. In an example, the length-adjustable turnbuckle can be mounted non-orthogonally relative to at least one link (e.g., a fixed-length link) that suspends the hopper subframe from the crusher frame. In an example, the length-adjustable turnbuckle can be mounted non-orthogonally relative to at least one actuator, leadscrew and nut, jackscrew, ball screw, roller screw, pneumatic cylinder, hydraulic cylinder, hoist, winch, or rack and pinion that suspends the hopper subframe from the crusher frame. Suspending the hopper subframe using non-orthogonal suspension components and/or locating links can positively locate the hopper subframe relative to the crusher frame.

In some examples, the crusher can include a fixed-length link adapted to suspend the hopper subframe from the crusher frame, where a first portion of the fixed-length link is rigidly mounted to the crusher frame and a second portion of the fixed-length link is mounted to the hopper subframe via at least one of a mechanical articulating joint or a roller bearing.

In some examples, the crusher can include a fixed-length link adapted to suspend the hopper subframe from the crusher frame, where a first portion of the fixed-length link is mounted to the crusher frame via a first movable joint (e.g., at least one of a mechanical articulating joint or a roller bearing) and a second portion of the fixed-length link is mounted to the hopper subframe via a second movable joint (e.g., at least one of a mechanical articulating joint or a roller bearing).

In some embodiments, the crusher can include a fixed-length link adapted to suspend the hopper subframe from the crusher frame, where a first portion of the fixed-length link is rigidly mounted to the hopper subframe and a second portion of the fixed-length link is mounted to the crusher frame via at least one of a mechanical articulating joint or a roller bearing.

In some examples, a crusher can include (i) a crusher frame, (ii) a rotating platform, and (iii) a tracked undercarriage, where the crusher frame is rotatably mounted to the tracked undercarriage via the rotating platform.

In some examples, a conveyor support apparatus can include (i) a skid, (ii) a tray defining at least four locating pin orifices, and (iii) a support rigidly mounted between the skid and the tray. In some examples, the conveyor support apparatus can be configured to support a truss conveyor section of a crusher that can transport materials to be crushed to a picker and/or transport materials that have been crushed from a picker.

In some embodiments, the skid defines a stake orifice. In some examples, the conveyor support apparatus can include a guard section rigidly mounted to a side of the tray and extending away from the skid. In some examples, the conveyor support apparatus can include a padeye fastened to the skid. In some examples, a portion (e.g., an outer edge) of the skid is rolled (i.e., curved) away from a side of the skid and the side of the skid faces away from the tray. In some examples, a portion of the skid is curved away from a side of the skid that (i) faces away from the tray and is (ii) substantially parallel planar with a substantially planar surface of the tray that is configured to contact a truss conveyor section.

In some examples, the conveyor support apparatus can include a truss conveyor section comprising a locating pin rigidly mounted thereto and adapted to fit within a respective locating pin orifice with a clearance fit. Thus, when the tray supports the truss conveyor section and the locating pins are located within respective locating pin orifices, the truss conveyor section is positively located relative to the tray and cannot slide off of the tray. In some examples, the truss conveyor section further defines a locking pin orifice. In some examples, the locking pin orifice is adapted to receive a locking pin (e.g., a locking pin of a locking pin apparatus). In some examples, the locking pin orifice is adapted to receive a locking pin and provide a clearance fit.

In some embodiments, the conveyor support apparatus can include a locking pin apparatus having a structural portion and at least two locking pins, where at least one locking pin of the at least two locking pins is configured to fit within a respective locking pin orifice with a clearance fit. In some embodiments, at least one locking pin of the at least two locking pins is threaded and adapted to receive a nut to prevent the locking pin from leaving a respective locking pin hole. In some examples, the structural portion of the locking pin apparatus can bridge multiple conveyor truss sections, the locking pin apparatus can have respective locking pins located in respective locking pin orifices in each conveyor truss section in the multiple conveyor truss sections, and thus the locking pin apparatus can positively locate the multiple conveyor truss sections relative to each other.

The foregoing broadly outlines some of the features and technical advantages of the present teachings so the detailed description and drawings can be better understood. Additional features and advantages are also described in the detailed description. The conception and disclosed examples can be used as a basis for modifying or designing other devices for carrying out the same purposes of the present teachings. Such equivalent constructions do not depart from the technology of the teachings as set forth in the claims. The inventive features characteristic of the teachings, together with further objects and advantages, are better understood from the detailed description and the accompanying drawings. Each of the drawings is provided for the purpose of illustration and description only and does not limit the present teachings.

BRIEF DESCRIPTION OF THE DRAWINGS

The accompanying drawings are presented to describe examples of the present teachings and are not limiting.

FIGS. 5A-5B depict a non-limiting example of an adjustable hopper.

FIG. 6 depicts a non-limiting example of a tracked crusher.

Figure 1A:
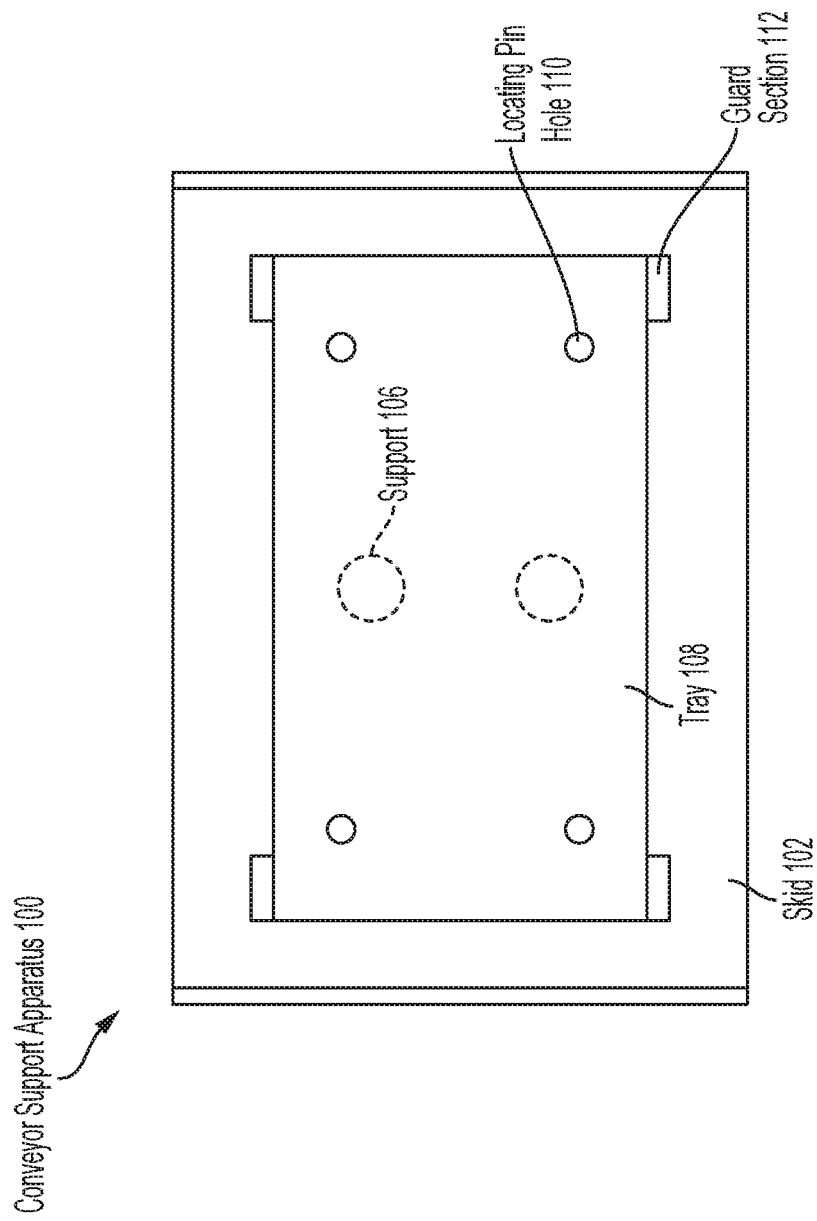
FIGS. 1A-1C depict a non-limiting example of a conveyor support apparatus.

In accordance with common practice, the features depicted by the drawings may not be drawn to scale. Accordingly, the dimensions of the depicted features may be arbitrarily expanded or reduced for clarity. In accordance with common practice, some of the drawings are simplified for clarity. Thus, the drawings may not depict all components of a particular apparatus or method. Further, like reference numerals denote like features throughout the specification and figures.

DETAILED DESCRIPTION

Provided are methods and apparatuses which process clay. In examples, provided are methods and apparatus configured to at mitigate challenges of working with and around clay during mining clay, processing clay, crushing clay, transporting clay, or combinations thereof. In some examples, the provided methods and apparatus can eliminate these challenges. In some embodiments, provided are apparatus configured to mitigate challenges of working with and around montmorillonite (MMT) during mining MMT, processing MMT (e.g., crushing MMT), transporting MMT, or combinations thereof. The provided apparatus and methods are not necessarily limited to mining MMT, processing MMT, transporting MMT, or combinations thereof, and can be used with mining, processing, and/or transporting other types of materials. For example, the provided apparatus and methods can be used during mining other types of clay, processing other types of clay, transporting other types of clay, or combinations thereof.

In some example, a clay processing device as described hereby can include a crusher, a feeder, or a combination thereof.

The examples disclosed hereby advantageously address the long-felt industry needs, as well as other previously unidentified needs, and mitigate shortcomings of conventional techniques. Among other advantages, an advantage provided by the examples is an improvement in mobility of crushers, conveyors, and other equipment used to mine, process, and transport clay. Further, examples of the provided systems and methods described herein can beneficially and advantageously improve the functioning of devices configured to process clay. In some examples, processing clay can include mining clay, crushing clay, transporting clay, or a combination thereof.

Numerous examples are disclosed in this application's text and drawings. Alternate examples can be devised without departing from the scope of this disclosure. Additionally, conventional elements of the current teachings may not be described in detail, or may be omitted, to avoid obscuring aspects of the current teachings. This description provides, with reference to the figures, detailed descriptions of example apparatus and methods for mining clay, processing clay, crushing clay, transporting clay, or a combination thereof.

Conveyor Support Apparatus

Figure 1B:
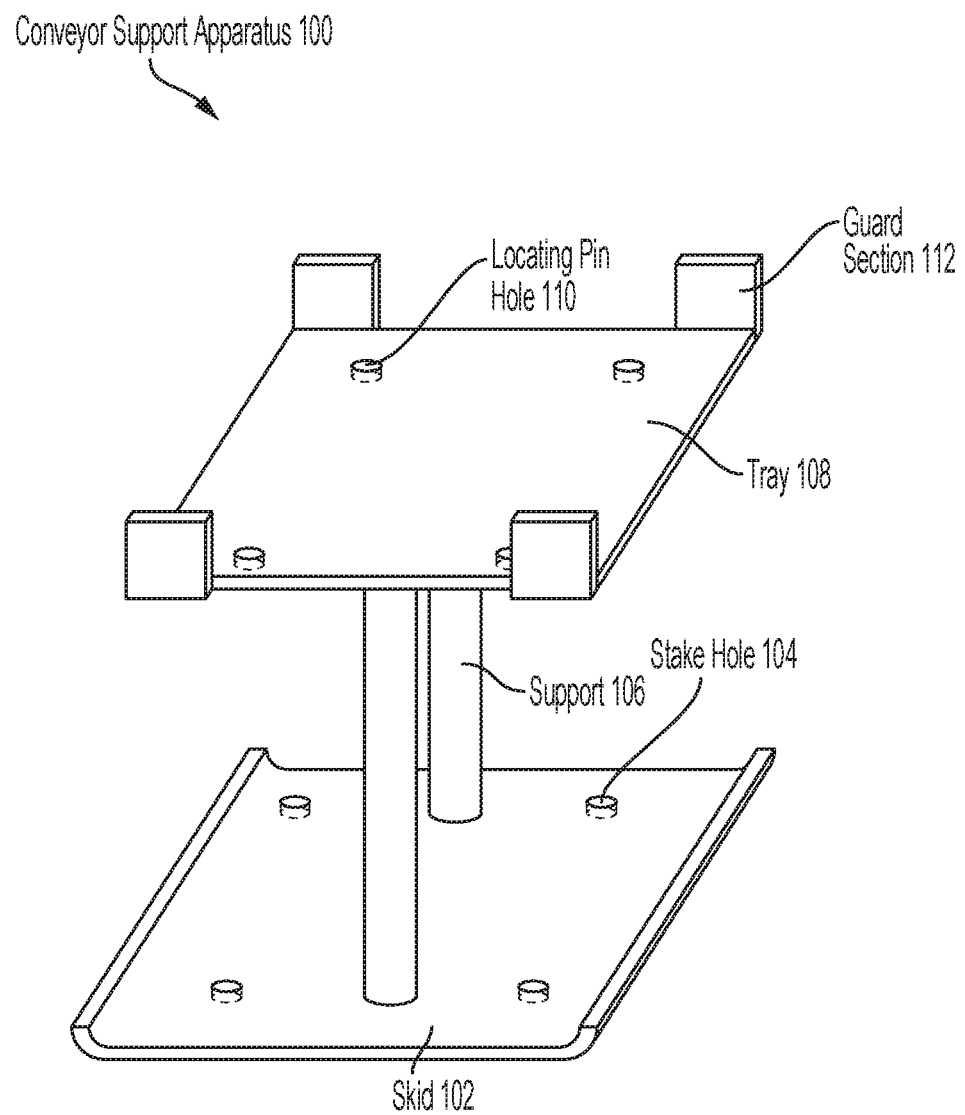
Figure 1C:
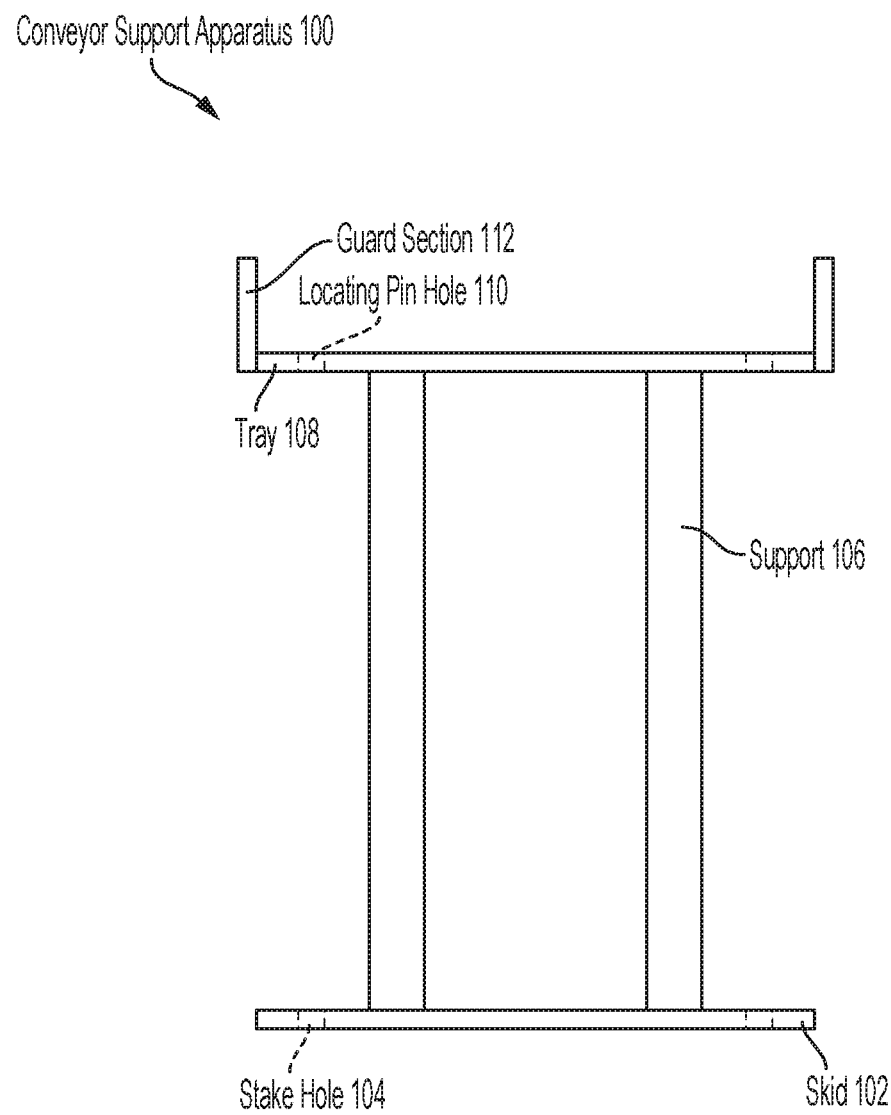

FIGS. 1A-1C depict a non-limiting example of a conveyor support apparatus 100. The conveyor support apparatus 100 can keep a conveyor (e.g., a truss conveyor) off the ground and make it easier to move the conveyor. Examples of the provided apparatus can advantageously make moving the conveyor to a different location easier and enable quickly moving the conveyor, when compared to conventional techniques. These benefits can reduce production losses due to the conveyor being unavailable for production use while being moved. In some examples, the conveyor support apparatus 100 can be configured to support truss conveyor sections (e.g., ends, middle sections, etc.) when the truss conveyor sections are standing still, when the truss conveyors are being moved (e.g., over MMT), or both.

The conveyor support apparatus 100 can include a skid 102 configured to distribute weight of the conveyor over a large surface area of ground (e.g., ground including MMT). The surface area of the bottom face of the skid 102, which is large relative to a surface area of the bottom of a truss conveyor section, reduces a depth the conveyor support apparatus 100 can sink into the ground.

In an example, a portion of the skid 102 can be configured to enable the skid 102 to slide over surfaces (e.g., surfaces that are increasingly higher) and thus can ease moving the conveyor support apparatus 100 over the ground. The portion of the skid 102 can be chamfered, angled, rolled away from a bottom of the skid 102, or combinations thereof to enable sliding the conveyor support apparatus 100 over uneven ground. In an example, the portion of the skid 102 can be chamfered, angled, rolled away from a bottom of the skid 102, or combinations thereof to reduce surface tension between the skid 102 and ground upon which the skid 102 rests.

In some examples, the skid 102 can have a padeye fastened to the skid 102 to enable fastening a tow cable to the skid 102, a lifting cable to the skid 102, or both. In some examples, the skid 102 can define a stake hole 104 (i.e., a stake orifice) through which a stake can be driven (e.g., to pin the skid 102 to the ground) during stationary operations to prevent the skid 102 from sliding on the ground. The skid 102 can define the stake hole 104 on a substantially planar portion of the skid 102, on a portion of the skid 102 contacting the ground, on a chamfered portion of the skid 102, on an angled portion of the skid 102, on a rolled portion of the skid 102, or a combination thereof.

The conveyor support apparatus 100 can include a support 106 fastened to the skid 102. The support 106 can be configured to support a conveyor (e.g., a truss conveyor section). In some examples, the support 106 can be a post oriented substantially orthogonally to the skid 102. In some examples, the support 106 can be a substantially vertical truss. In some examples, the support 106 can have a cross-section that is angled, oval, square, circular, or a combination thereof. In some examples, the support 106 can have a padeye fastened to the support 106, formed as a part of the support 106, or a combination thereof to enable fastening a tow cable, a lifting cable, or both to the support 106.

The conveyor support apparatus 100 can include a tray 108 fastened to the support 106, formed as a part of the support 106, or both. The tray 108 can be configured to support the conveyor and transfer at least a portion of the weight of the conveyor to the support 106 and the skid 102. The tray 108 can be oriented substantially horizontally with the ground, substantially co-planar with the skid 102, or both. The tray 108 can be oriented substantially parallel planar with the skid 102. In an example, the tray 108 can be oriented at an angle relative to the skid 102 to enable supporting an ascending conveyor, a descending conveyor, or both. The tray 108 can define a locating pin hole 110 (i.e., a locating pin orifice) configured to receive a locating pin (e.g., locating pin 216 of FIG. 2) of a conveyor (e.g., a truss conveyor section), fastener of a conveyor, or both.

In some examples, the tray 108 can include a guard section 112 fastened to the tray 108, formed as a portion of the tray 108, or both. A portion of the guard section 112 can extend beyond a surface of the tray 108. The guard section 112 can be configured to limit motion of the conveyor relative to the tray 108 (e.g., in a direction substantially co-planar with the tray 108). In some examples, the guard section 112 can keep the conveyor from sliding off of the tray 108. In some embodiments, the guard section 112 can orient a first truss conveyor section relative to the conveyor support apparatus 100, relative to a second truss conveyor section, or both.

Locking Pin Apparatus

Figure 2:
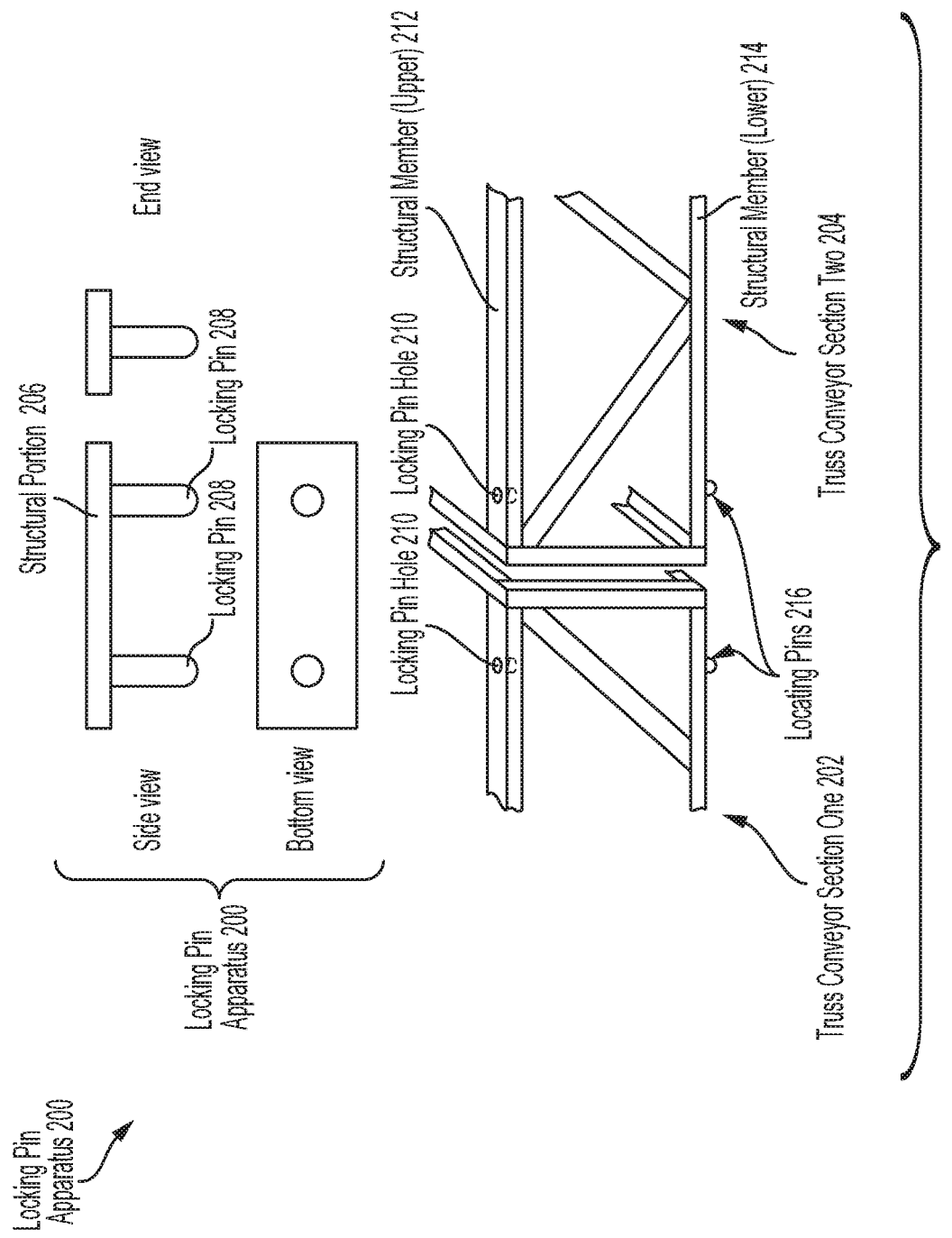
FIG. 2 depicts a non-limiting example of a locking pin apparatus.

FIG. 2 depicts a non-limiting example of a locking pin apparatus 200. The locking pin apparatus 200 can beneficially fasten multiple conveyor sections (e.g., truss conveyor section one 202 and truss conveyor section two 204) together, such as while the multiple conveyor sections are being moved, when the multiple conveyor sections are stationary, or both.

The locking pin apparatus 200 can include a structural portion 206 upon which at least two locking pins 208 are fastened to the locking pin apparatus 200, formed as a part of the locking pin apparatus 200, or both. In an example, at least a portion of the locking pin 208 can be threaded and thus configured as a threaded fastener. In an example, a locking pin 208 configured as a threaded fastener can be fastened to another threaded fastener (e.g., a nut) to prevent the locking pin 208 from leaving a respective locking pin hole 210 through which the locking pin 208 passes.

In some embodiments, a conveyor section (e.g., truss conveyor section one 202 and truss conveyor section two 204) can include a structural member (e.g., structural member (upper) 212) defining the locking pin hole 210 (i.e., a locking pin orifice) configured to receive locking pin 208. In an example, the structural member (e.g., structural member (upper) 212) in which the locking pin hole 210 can be defined can be substantially co-planar with another structural member (e.g., structural member (lower) 214) that can be configured to rest on the tray 108. In an example, the structural member (e.g., structural member (upper) 212) defining the locking pin hole 210 can be located on a side of the conveyor section that is opposite to another structural member (e.g., structural member (lower) 214) configured to rest on the tray 108. In an example, the locking pin hole 210 defined by the structural member (e.g., structural member (upper) 212) can be sized such as to provide a clearance fit when the locking pin 208 is inserted through the locking pin hole 210.

In an example, the locking pin apparatus 200 can be used to fasten at least two conveyor sections (e.g., truss conveyor section one 202 and truss conveyor section two 204) together, locate at least two conveyor sections relative to each other, lock at least two conveyor sections together, or a combination thereof. In an embodiment, the locking pins 208 of the locking pin apparatus 200 can be inserted onto respective locking pin holes 210 of at least two conveyor sections (e.g., truss conveyor section one 202 and truss conveyor section two 204) to fasten each of the conveyor sections to each other. In an example, the locking pins 208 of the locking pin apparatus 200 can be inserted onto respective locking pin holes 210 of at least two conveyor sections (e.g., truss conveyor section one 202 and truss conveyor section two 204) to locate each of the conveyor sections relative to each other. In an example, the locking pins 208 of the locking pin apparatus 200 can be inserted onto respective locking pin holes 210 of at least two conveyor sections (e.g., truss conveyor section one 202 and truss conveyor section two 204) to lock each of the conveyor sections relative to each other.

In some examples, a truss conveyor section (e.g., truss conveyor section one 202 and truss conveyor section two 204) can include a locating pin 216 rigidly mounted thereto and adapted to fit within the locating pin hole 110 (e.g., with a clearance fit). Thus, when the tray 108 supports the truss conveyor section and the locating pin 216 is located within the locating pin hole 110, the truss conveyor section is positively located relative to the tray 108 and cannot slide off of the tray 108.

Examples of the locking pin apparatus 200 can be used to fasten at least two table-top moveable conveyor sections (e.g., truss conveyor section one 202 and truss conveyor section two 204) together, locate at least two table-top moveable conveyor sections relative to each other, lock at least two table-top moveable conveyor sections together, or a combination thereof. In an example, the locking pin apparatus 200 can be used with an overland conveyor system utilizing a 24-inch deep truss conveyor spanned over 40-foot sections mounted on the conveyor support apparatus 100 (e.g., table tops) for ease and efficiency of movement to a new location, such as movement to accommodate movement of a mine face during mining operations.

Movable Picker Apparatus

Figure 3A:
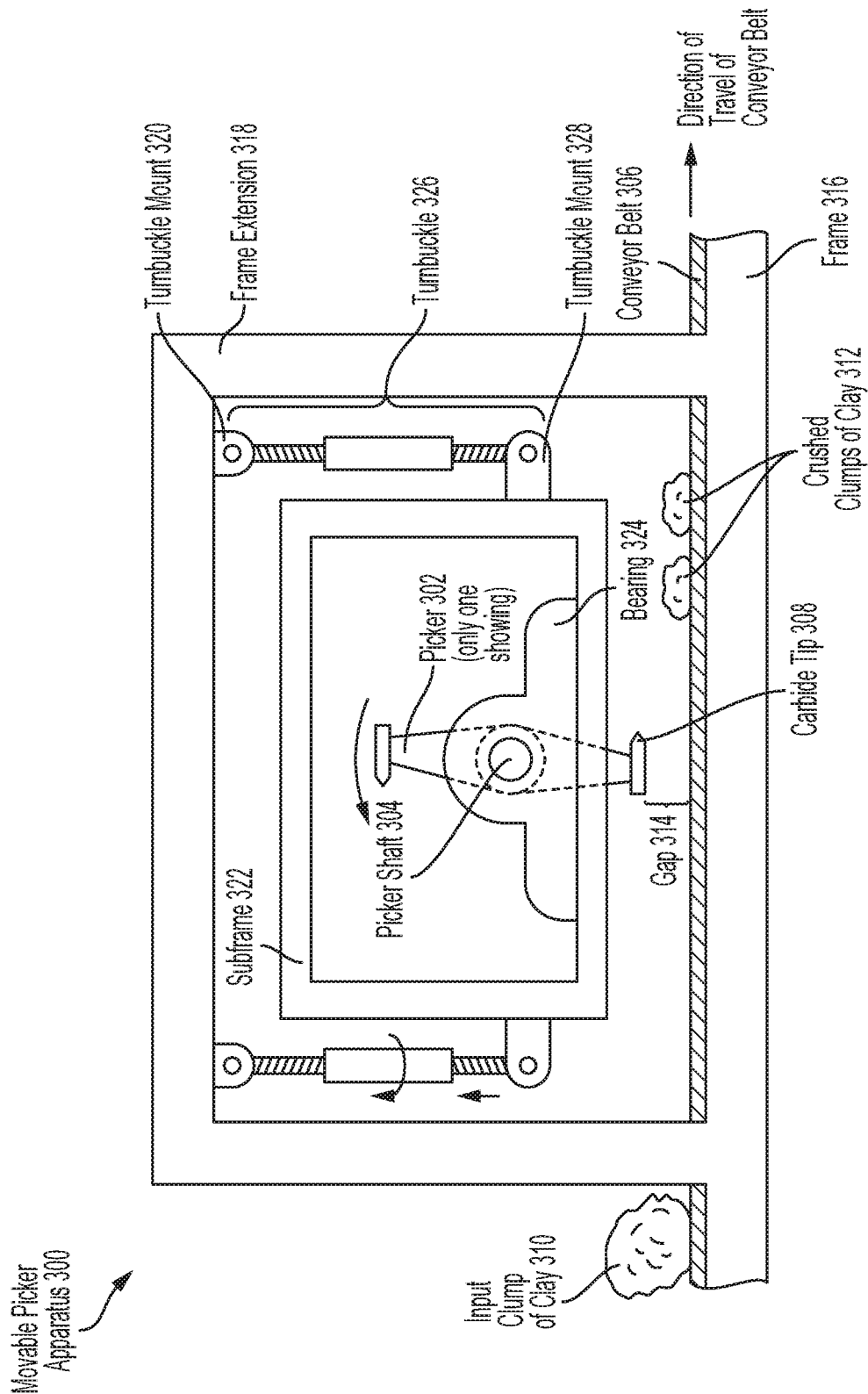
FIGS. 3A-3B depict a non-limiting example of a movable picker apparatus.
Figure 3B:
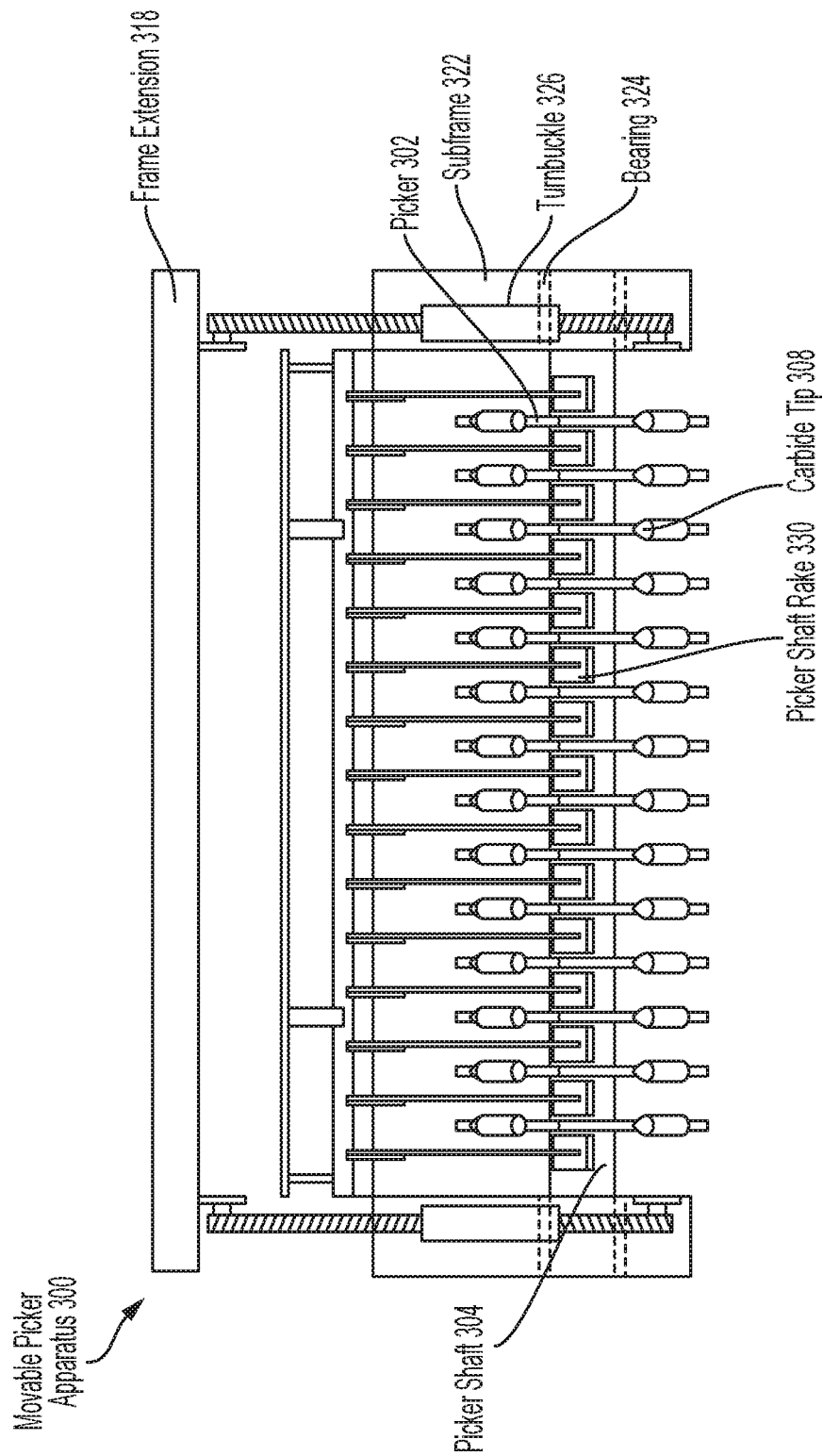

FIGS. 3A-3B depict a non-limiting example of a movable picker apparatus 300. In some applications, crushed clay is desirable, as reducing sizes of clay particles increases the surface area of the clay particles and thus makes the clay particles easier to dry. The movable picker apparatus 300 can be a constituent part of a crusher that is configured to crush large lumps of clay into smaller pieces of clay. In an example, the crusher can be a horizontal impact crusher including a hopper configured to receive large lumps of clay and transfer the large lumps of clay to a conveyor belt that in turn feeds the large lumps of clay to at least one picker stage. Each picker stage has rotating pickers that strike the large lumps of clay to break the large lumps of clay into smaller lumps of clay. Subsequent picker stages, when implemented, can strike the smaller lumps of clay to further reduce the size of the lumps of clay. The conveyor belt can then transport the output of the last picker stage to other conveying equipment, a pile of crushed clay, a receptacle, other clay processing equipment, earthmoving equipment, or a combination thereof.

A picker stage can include the movable picker apparatus 300. The movable picker apparatus 300 can have rotatable pickers 302 that are fixed to a rotatable picker shaft 304. The picker 302 can have a protruding pointed portion that can be pointed substantially in the direction of rotation of the rotatable pickers. The protruding pointed portion can be pointed substantially in the direction of movement of a conveyor belt 306 of the crusher. In an example, the picker 302 has a protruding pointed portion. Multiple pickers can be substantially evenly spaced about the circumference of the picker shaft 304. Clay can be acidic and abrasive, thus the protruding pointed portion(s) of the picker 302 can have a respective carbide tip 308 to decrease wear and resist acid erosion.

During operation, an input lump of clay 310 can be fed into the movable picker apparatus 300 (e.g., in a substantially horizontal direction by the conveyor belt 306). As the pickers shaft rotates, the protruding pointed portion of the picker 302 forces the input lump of clay 310 against the conveyor belt 306 and the protruding pointed portion of the picker 302 impacts the input lump of clay 310, is forced into the input lump of clay 310, or a combination thereof, thus breaking the input lump of clay 310 into smaller pieces (e.g., crushed lumps of clay 312). In an example, the direction of the conveyor belt 306 can be substantially the same as the movement of the picker 302 at a point where the picker 302 is nearest to the conveyor belt 306.

In an example, the picker 302 does not contact the conveyor belt 306 and thus there is a gap 314 between the conveyor belt 306 and the picker 302 at the point where the picker 302 is nearest to the conveyor belt 306. The size of the gap can be a factor that determines if the picker 302 will impact the input lump of clay 310 on the conveyor belt 306. In other words, the size of the gap determines the smallest size of lumps of clay that can be crushed by the picker 302. If the gap is smaller, then smaller lumps of clay are more likely to be crushed by the picker 302. If the gap is larger, then the smaller lumps of clay are less likely to be crushed by the picker 302.

In some examples, the movable picker apparatus 300 can provide adjustability of the gap and thus variable control over the smallest size of the input lump of clay 310 that will be crushed by the picker 302. In turn, the adjustability of the gap can determine the largest size of clay lumps that exit the movable picker apparatus 300 on the conveyor belt 306.

In some examples, the crusher can include a frame 316 (e.g., a crusher frame) that provides structural support to portions of the crusher. A frame extension 318 can be a part of the frame 316, securely fastened to the frame 316, or both. The frame extension 318 can provide structural support for the movable picker apparatus 300. The frame extension 318 can provide structural support for the movable picker apparatus 300. In an example, the frame extension 318 can include a respective turnbuckle mount 320. In an example, the frame 316 can include a respective turnbuckle mount.

In some examples, the movable picker apparatus 300 can be at least partially supported (e.g., movably supported) by the frame extension 318. In some examples, the movable picker apparatus 300 can be at least partially supported (e.g., movably supported) by the frame 316. The movable picker apparatus 300 can include a crusher subframe 322 that can be at least partially supported by the frame extension 318, the frame 316, or both.

In some examples, the movable picker apparatus 300 can be at least partially suspended (e.g., movably suspended) from the frame extension 318. In some examples, the movable picker apparatus 300 can be at least partially suspended (e.g., movably suspended) from the frame 316. The movable picker apparatus 300 can include the crusher subframe 322 that can be at least partially suspended from the frame extension 318, the frame 316, or both.

A bearing 324 (e.g., a pillow block bearing, a rotary bearing, or a different suitable bearing) can be fastened to the crusher subframe 322. The bearing 324 can be configured to support a rotatable picker shaft and enable the rotatable picker shaft to rotate relative to the crusher subframe 322. The picker 302 can be mounted to the rotatable picker shaft and can rotate when the rotatable picker shaft is rotated. The rotatable picker shaft 304 can be driven by a prime mover. In examples, the prime mover can be an electric motor, a gasoline engine, a diesel engine, or a combination thereof. In an example, the crusher subframe 322 can include a respective turnbuckle mount. In some examples, the picker 302 can be suspended above the conveyor belt via a length-adjustable turnbuckle 326, thus making the picker movable relative to the frame extension 318, the conveyor belt, and/or the frame 316.

In an example, an actuator such as a leadscrew and nut, a jackscrew, a ball screw, a roller screw, a pneumatic cylinder, a hydraulic cylinder, a hoist, a winch, a rack and pinion, a chain drive, a belt drive, a chain drive, or a combination thereof can be used in place of the length-adjustable turnbuckle 326 described hereby. In an example, an actuator such as a leadscrew and nut, a jackscrew, a ball screw, a roller screw, a pneumatic cylinder, a hydraulic cylinder, a hoist, a winch, a rack and pinion, a chain drive, a belt drive, a chain drive, or a combination thereof can be used in addition to the length-adjustable turnbuckle 326 described hereby to movably support the crusher subframe 322 relative to the frame 316.

In an example, a length of the length-adjustable turnbuckle 326, the actuator, or both can be adjusted with an electric motor, a pneumatic motor, a hydraulic motor, an engine, or a combination thereof that is mechanically coupled to move the length-adjustable turnbuckle 326, the actuator, or both. In an example, a length of the length-adjustable turnbuckle 326, the actuator, or both can be adjusted manually.

In an example, a first threaded portion of the length-adjustable turnbuckle 326 can be fastened to the frame extension 318 (e.g., directly to the frame extension 318 or via the turnbuckle mount 320 of the frame extension 318). In an embodiment, the first threaded portion of the length-adjustable turnbuckle 326 can be fastened to the turnbuckle mount 320 of the frame extension 318 (e.g., via a threaded fastener). In an embodiment, the first threaded portion of the length-adjustable turnbuckle 326 can be fastened (e.g., directly) to the frame extension 318 (e.g., via a threaded fastener).

In an example, the first threaded portion of the length-adjustable turnbuckle 326 can be fastened to the turnbuckle mount 320 of the frame extension 318 via a mechanical articulating joint (e.g., a ball joint, a rod end bearing, a heim joint, a rose joint, etc.). In an embodiment, the first threaded portion of the length-adjustable turnbuckle 326 can be fastened to the frame extension 318 (e.g., directly) via a mechanical articulating joint (e.g., a ball joint, a rod end bearing, a heim joint, a rose joint, etc.). In an example, the mechanical articulating joint can reduce binding of the length-adjustable turnbuckle 326.

In an example, a second threaded portion of the length-adjustable turnbuckle 326 can be fastened to the crusher subframe 322 (e.g., directly to the crusher subframe 322 or via a respective turnbuckle mount 328 of the crusher subframe 322). In an example, the second threaded portion of the length-adjustable turnbuckle 326 can be fastened to the crusher subframe 322 (e.g., with a threaded fastener). In an example, the second threaded portion of the length-adjustable turnbuckle 326 can be fastened to the respective turnbuckle mount 328 of the crusher subframe 322 (e.g., with a threaded fastener).

In an embodiment, the second threaded portion of the length-adjustable turnbuckle 326 can be fastened to the crusher subframe 322 via a mechanical articulating joint (e.g., a ball joint, a rod end bearing, a heim joint, a rose joint, etc.). In an embodiment, the second threaded portion of the length-adjustable turnbuckle 326 can be fastened to the respective turnbuckle mount 328 of the crusher subframe 322 via a mechanical articulating joint (e.g., a ball joint, a rod end bearing, a heim joint, a rose joint, etc.).

In a non-limiting example, the movable picker apparatus 300 can be at least partially suspended from the frame extension 318 by three or four of the length-adjustable turnbuckle 326.

In an example, the movable picker apparatus 300 can be at least partially suspended from the frame extension 318 by multiple length-adjustable turnbuckles, where at least one of the length-adjustable turnbuckles is mounted non-orthogonally relative to the frame extension 318, the crusher subframe 322, or both, in order to reduce movement of the crusher subframe 322 relative to the frame extension 318.

In an example, the movable picker apparatus 300 can be at least partially located relative to the frame extension 318 by a link having a fixed length, in order to control and/or reduce movement of the crusher subframe 322 relative to the frame extension 318.

In an example, a first portion of the link is rigidly mounted to the frame 316 and a second portion of the link is mounted to the crusher subframe 322 via a mechanical articulating joint (e.g., a ball joint, a rod end bearing, a heim joint, a rose joint, etc.). In an example, the first portion of the link is rigidly mounted to the frame 316 and the second portion of the link is mounted to the crusher subframe 322 via a rotary bearing adapted to enable the link to rotate relative to the crusher subframe 322.

In an example, the first portion of the link is rigidly mounted to the crusher subframe 322 and the second portion of the link is mounted to the frame 316 via a mechanical articulating joint. In an example, the first portion of the link is rigidly mounted to the crusher subframe 322 and the second portion of the link is mounted to the frame 316 via a rotary bearing adapted to enable the link to rotate relative to the frame 316.

In an example, adjusting the length-adjustable turnbuckle 326 can increase or decrease the gap 314 between the conveyor belt 306 and the pickers at the point where the pickers are nearest to the conveyor belt 306. Adjusting the length-adjustable turnbuckle 326 can also move the picker 302 away from the conveyor belt 306 to ease access to the picker 302 for maintenance, repairs, or both. In a non-limiting example, the gap 314 can be adjusted from substantially the surface of the conveyor belt 306 (e.g., without contacting the conveyor belt 306) to between substantially four inches from the surface of the conveyor belt 306 to substantially 24 inches from the surface of the conveyor belt 306.

In an example, adjusting the length-adjustable turnbuckle 326 to shorten the length-adjustable turnbuckle 326 can increase a distance between the crusher subframe 322 and the conveyor belt 306. In an example, adjusting the length-adjustable turnbuckle 326 to shorten the length-adjustable turnbuckle 326 can increase the gap 314. Adjusting the length-adjustable turnbuckle 326 to shorten the length-adjustable turnbuckle 326 can move the picker away from the conveyor belt 306.

In an example, adjusting the length-adjustable turnbuckle 326 to lengthen the length-adjustable turnbuckle 326 can decrease a distance between the crusher subframe 322 and the conveyor belt 306. In an example, adjusting the length-adjustable turnbuckle 326 to lengthen the length-adjustable turnbuckle 326 can decrease the gap 314. Adjusting the length-adjustable turnbuckle 326 to lengthen the length-adjustable turnbuckle 326 can move the picker toward the conveyor belt 306.

Picker Shaft Rake

Figure 4A:
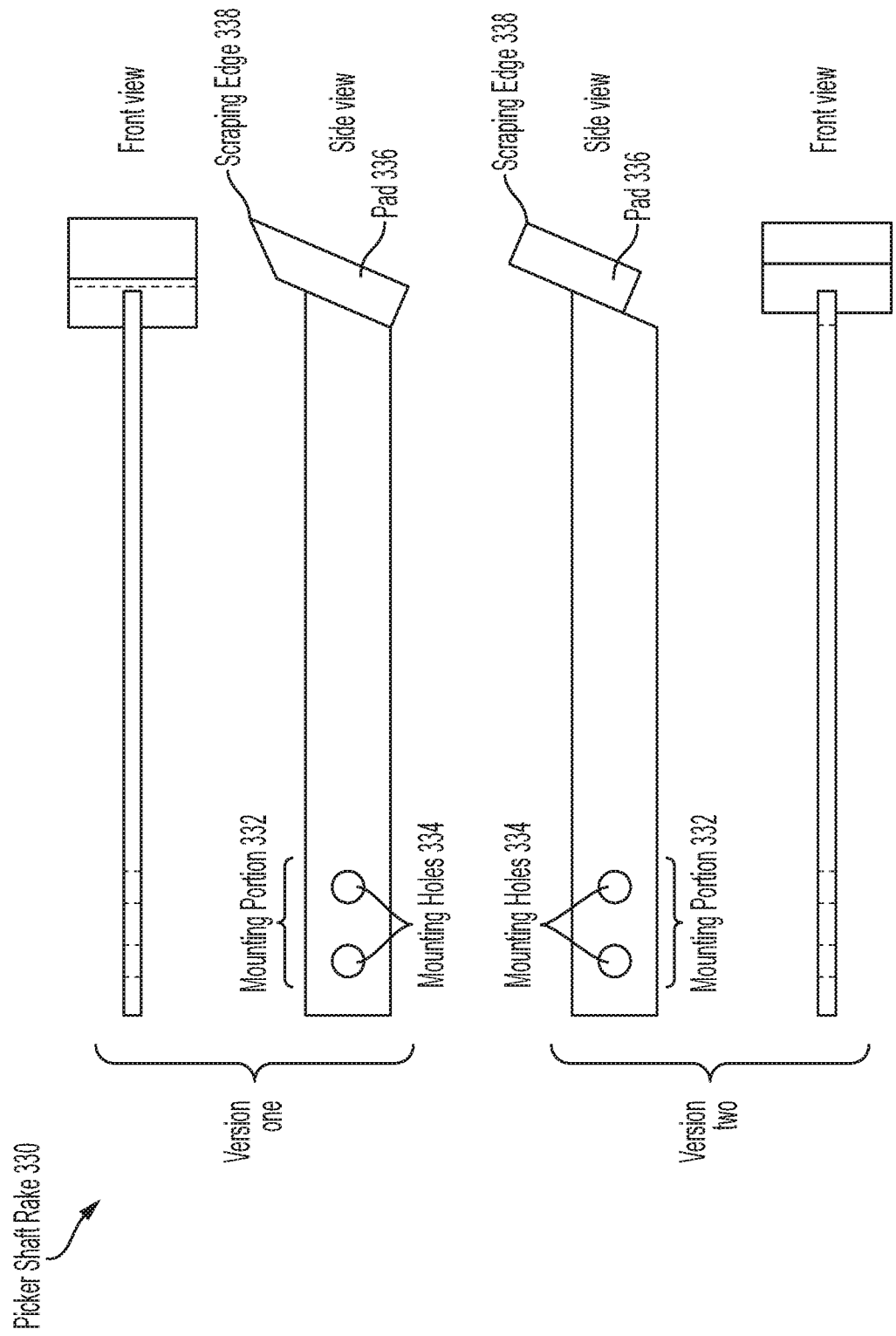
FIGS. 4A-4B depict a non-limiting example of a picker shaft rake.
Figure 4B:
Figure 4B:
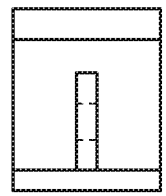
Figure 4B:
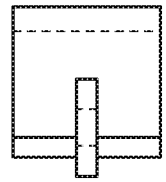
Figure 4B:

FIGS. 3B and 4A-4B depict a non-limiting example of a picker shaft rake 330. In some applications, during use, clay can build up on the rotatable picker shaft 304 in regions between pickers. The picker shaft rake 330 can be used to remove at least a part of the built-up clay in order to reduce rotating mass of the rotatable picker shaft 304 (and thus reduce energy consumption and shaft bearing wear) as well as to reduce imbalances of the rotatable picker shaft 304.

Referring to FIGS. 4A-4B, the picker shaft rake 330 can include a mounting portion 332. The mounting portion 332 can be located at an end portion of the picker shaft rake 330, at a middle portion of the picker shaft rake 330, or both. The mounting portion 332 can define at least one mounting hole 334 (e.g., an orifice) by which the picker shaft rake may be mounted to another component of the crusher. The picker shaft rake 330 can be fastened (e.g., via a mounting flange) to the crusher subframe 322 of the movable picker apparatus 300, the crusher subframe 322 of a crusher, a frame 316 of a crusher, the like, or a combination thereof. The mounting portion 332 can enable quickly installing the picker shaft rake 330, quickly replacing the picker shaft rake 330, quickly removing the picker shaft rake 330, or a combination thereof.

The picker shaft rake 330 can include a pad 336. During operation, the pad 336 can remove built-up clay from the rotatable picker shaft 304. The picker shaft rake 330 can be mounted such that the pad 336 can be located substantially near a rotatable surface of the rotatable picker shaft 304. For example, a pad surface can be located between substantially zero inches to two inches from a rotatable surface of the rotatable picker shaft 304. For example, a pad scraping edge can be located between zero to two inches from a rotatable surface of the rotatable picker shaft 304. In some examples, the picker shaft rake 330 can be mounted such that at least a portion of the pad 336 at least occasionally contacts the rotatable surface of the rotatable picker shaft 304. In a non-limiting example, the pad 336 can be located between two pickers. In some examples, multiple picker shaft rakes can be mounted between respective pickers. In some examples, multiple picker shaft rakes can be mounted between two pickers.

In non-limiting examples, the pad 336 can have a chamfered edge to reduce resistance between the built-up clay and the pad 336, thus reducing wear on the pad 336. The chamfered edge can also enable built-up clay being removed to force the pad 336 closer to the rotatable picker shaft 304.

In an example, the pad 336 can have a scraping edge 338. The picker shaft rake 330 can be mounted such that the scraping edge 338 can be located substantially near a rotatable portion of the rotatable picker shaft 304. In some examples, the picker shaft rake 330 can be mounted such that at least a portion of the scraping edge 338 contacts the rotatable portion of the rotatable picker shaft 304.

During operation, the rotatable picker shaft 304 rotates, forcing built-up clay on the rotatable picker shaft 304 to impact the pad 336 of the picker shaft rake 330. The pad 336 of the picker shaft rake 330 in turn forces at least a part of the built-up clay off of the rotatable picker shaft 304. In an example, rotating the rotatable picker shaft 304 forces built-up clay on the rotatable picker shaft 304 to impact the scraping edge 338 of the picker shaft rake 330. The scraping edge 338 of the picker shaft rake 330 in turn forces at least a part of the built-up clay off of the rotatable picker shaft 304.

Adjustable Hopper

Figure 5B:
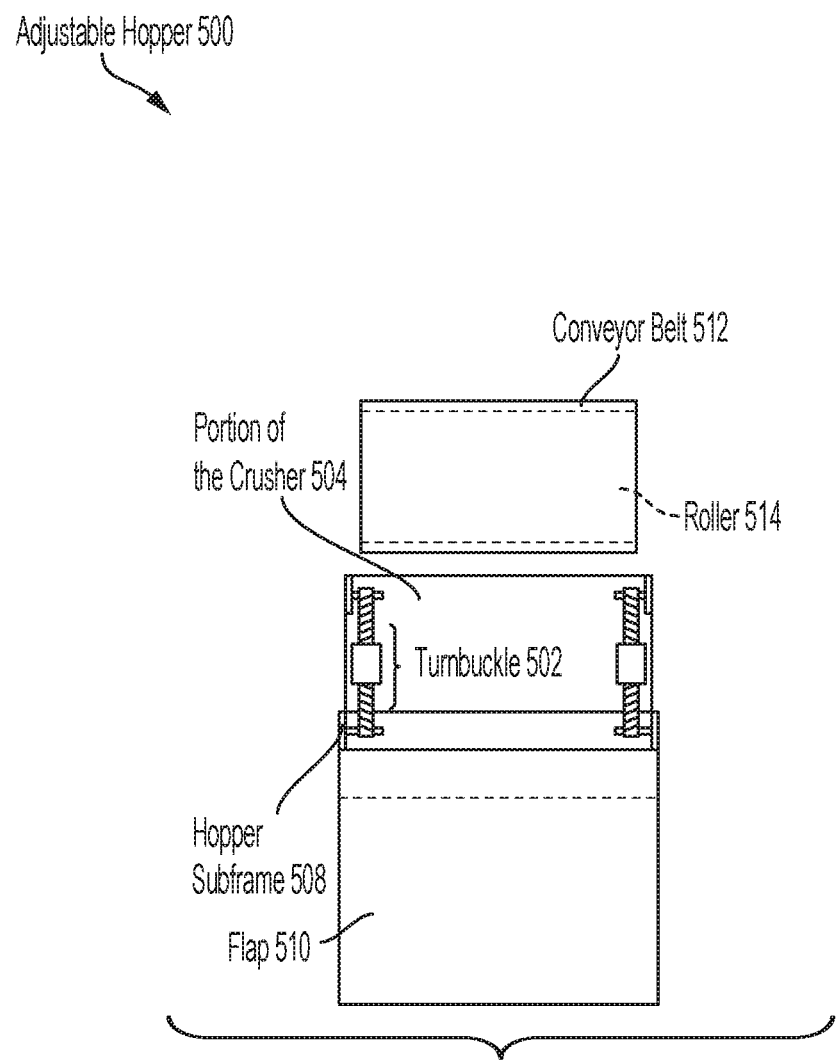

FIGS. 5A-5B depict a non-limiting example of an adjustable hopper 500. In some non-limiting examples, the adjustable hopper 500 can be located at an output of a clay processing device (e.g., a crusher, a feeder) to guide clay onto a conveyor, into a receptacle, into a chute, or a combination thereof. The adjustable hopper 500 can be raised to clear a conveyor, a receptacle, or another obstacle when moving the clay processing device. In an example, the adjustable hopper 500 can be raised to reduce mechanical interference with the conveyor, the receptacle, or the other obstacle when moving the clay processing device. The adjustable hopper 500 can be lowered to direct clay into the receptacle, into a chute, or a combination thereof. In some non-limiting examples, the conveyor can be an overland conveyor.

The adjustable hopper 500 can be supported at least in part by the clay processing device (e.g., the frame 316, the frame extension 318, the crusher subframe 322, a hopper support, or a combination thereof) via a length-adjustable turnbuckle 502, thus making the adjustable hopper 500 movable relative to other portions of the clay processing device (e.g., the frame 316, the frame extension 318, the crusher subframe 322, the hopper support, or the combination thereof).

In an example, an actuator such as a leadscrew and nut, a jackscrew, a ball screw, a roller screw, a pneumatic cylinder, a hydraulic cylinder, a hoist, a winch, a rack and pinion, a chain drive, a belt drive, a chain drive, or a combination thereof can be used in place of the length-adjustable turnbuckle 502 described hereby. In an example, an actuator such as a leadscrew and nut, a jackscrew, a ball screw, a roller screw, a pneumatic cylinder, a hydraulic cylinder, a hoist, a winch, a rack and pinion, a chain drive, a belt drive, a chain drive, or a combination thereof can be used in addition to the length-adjustable turnbuckle 502 described hereby to support the adjustable hopper 500 at least in part by the clay processing device.

In an example, a length of the length-adjustable turnbuckle 502, the actuator, or both can be adjusted with an electric motor, a pneumatic motor, a hydraulic motor, an engine, or a combination thereof that is mechanically coupled to move the length-adjustable turnbuckle 502, the actuator, or both. In an example, a length of the length-adjustable turnbuckle 502, the actuator, or both can be adjusted manually.

In an example, a first threaded portion of the length-adjustable turnbuckle 502 can be fastened to the clay processing device (e.g., a portion of a crusher 504) via a respective turnbuckle mount of the clay processing device 506. In an embodiment, the first threaded portion of the length-adjustable turnbuckle 502 can be fastened to the respective turnbuckle mount of the clay processing device 506 (e.g., via a threaded fastener). In an embodiment, the first threaded portion of the length-adjustable turnbuckle 502 can be fastened to the clay processing device (e.g., via a threaded fastener). In an example, the first threaded portion of the length-adjustable turnbuckle 502 can be fastened to the respective turnbuckle mount of the clay processing device 506 via a mechanical articulating joint (e.g., a ball joint, a rod end bearing, a heim joint, a rose joint, etc.). In an embodiment, the first threaded portion of the length-adjustable turnbuckle 502 can be fastened to the clay processing device with a mechanical articulating joint (e.g., a ball joint, a rod end bearing, a heim joint, a rose joint, etc.). In an example, the mechanical articulating joint can reduce binding of the length-adjustable turnbuckle 502.

The adjustable hopper 500 can include a hopper subframe 508 to which the length-adjustable turnbuckle 502 is fastened. The hopper subframe 508 can include a respective turnbuckle mount.

In an example, a second threaded portion of the length-adjustable turnbuckle 502 can be fastened to the hopper subframe 508 (e.g., directly to the hopper subframe 508 or via the respective turnbuckle mount of the hopper subframe 508). In an example, the second threaded portion of the length-adjustable turnbuckle 502 can be fastened to the hopper subframe 508 via a threaded fastener. In an example, the second threaded portion of the length-adjustable turnbuckle 502 can be fastened to the respective turnbuckle mount of the hopper subframe 508 via a threaded fastener. In an embodiment, the second threaded portion of the length-adjustable turnbuckle 502 can be fastened to the hopper subframe 508 via a mechanical articulating joint (e.g., a ball joint, a rod end bearing, a heim joint, a rose joint, etc.). In an embodiment, the second threaded portion of the length-adjustable turnbuckle 502 can be fastened to the respective turnbuckle mount of the hopper subframe 508 via a mechanical articulating joint (e.g., a ball joint, a rod end bearing, a heim joint, a rose joint, etc.)

In an example, a flap 510 can guide clay from the clay processing device onto a conveyor, into a receptacle, the like, or a combination thereof. In an embodiment, the flap 510 can reduce spilling clay. The flap 510 can be a rigid flap, a flexible flap, or both. The flap 510 can be fastened to the hopper subframe 508 (e.g., with a threaded fastener). In an example, the flap 510 can be fastened to the hopper subframe 508 via a hinge that enables the flap 510 to move relative to the hopper subframe 508. In an example, the flap 510 can be curved, flat, angled, or a combination thereof to guide the clay. In an example, the flap 510 can be mounted substantially orthogonal to a surface of the hopper subframe 508 (e.g., a surface substantially facing a direction in which clay flows). In an example, the flap 510 can be mounted substantially at an angle relative to the surface of the hopper subframe 508 to direct clay to a specific location, to reduce spilling clay, or both.

In an example, adjusting the length-adjustable turnbuckle 502 to shorten the length-adjustable turnbuckle 502 can decrease a distance between the hopper subframe 508 and another portion of the clay processing device. In an example, adjusting the length-adjustable turnbuckle 502 to shorten the length-adjustable turnbuckle 502 can raise the hopper subframe 508, raise the flap 510, or both. Adjusting the length-adjustable turnbuckle 502 to shorten the length-adjustable turnbuckle 502 can also move the flap 510 away from another device such as a conveyor belt (e.g., the conveyor belt 306), a receptacle, a chute, or a combination thereof to ease moving the clay processing device and the other device relative to each other.

In an example, adjusting the length-adjustable turnbuckle 502 to lengthen the length-adjustable turnbuckle 502 can increase a distance between the hopper subframe 508 and another portion of the clay processing device. In an example, adjusting the length-adjustable turnbuckle 502 to lengthen the length-adjustable turnbuckle 502 can lower the hopper subframe 508, lower the flap 510, or both. Adjusting the length-adjustable turnbuckle 502 to lengthen the length-adjustable turnbuckle 502 can also move the flap 510 toward another device such as a conveyor belt (e.g., the conveyor belt 306), a receptacle, a chute, or a combination thereof. In an example, moving the flap 510 toward the other device can direct clay into the other device, reduce spilling clay, or both.

FIG. 5 also depicts a material supply conveyor belt 512 (e.g., conveyor belt 306) that may feed material into the adjustable hopper 500. The material supply conveyor belt 512 may be supported by a roller 514.

Tracked Crusher

FIG. 6 depicts a non-limiting example of a tracked crusher 600. In some examples, a crusher 602 can be mounted atop a tracked undercarriage 604 to enable quickly maneuvering the crusher 602 between locations, accurately maneuvering the crusher 602 between locations, or both. Quick location changes can beneficially reduce lost production time. Accurate location changes can beneficially reduce lost materials due to spillage.

In some examples, when compared to conventional techniques, tracks (e.g., track 606) can provide enhanced traction on slippery surfaces, uneven surfaces, sticky MMT, slippery MMT, or a combination thereof. In some examples, the tracks can be steel tracks, rubber tracks, or a combination thereof. Rubber tracks can beneficially provide low ground pressure to mitigate sinking of the crusher 602 into the ground (e.g., MMT). Steel tracks can beneficially enable enhanced traction over slippery ground (e.g., MMT). The tracks can be powered via hydraulics, an electric motor, a diesel engine, a gasoline engine, or a combination thereof. The hydraulics, the electric motor, the diesel engine, the gasoline engine, or the combination thereof can be a part of the tracked undercarriage 604. In an example, the hydraulics, the electric motor, the diesel engine, the gasoline engine, or the combination thereof can be mounted atop the tracked undercarriage 604 as a part of the crusher 602.

The tracked crusher 600 can be self-propelled. A self-propelled crusher beneficially eliminates a need for a crane or an earthmover to move the crusher 602. In an example, the self-propelled crusher can be relocated faster than when moved by the crane or the earthmover, thus beneficially reducing an amount of time when the crusher 602 is unavailable.

In some examples, the crusher 602 can be mounted atop a rotating platform to beneficially enable rotating the crusher 602 to align the crusher 602 with other equipment (e.g., a conveyor), accurately rotating the crusher 602 to align the crusher 602 with other equipment (e.g., the conveyor), or both. The rotating platform can be positioned between the tracked undercarriage 604 and the crusher 602. The rotating platform can be powered (e.g., to rotate the rotating platform and thus the crusher 602, to propel the tracked crusher 600 via the track 606, or both) via hydraulics, an electric motor, a diesel engine, a gasoline engine, or a combination thereof. In an example, the hydraulics, the electric motor, the diesel engine, the gasoline engine, or the combination thereof can be a part of the tracked undercarriage 604. In an example, the hydraulics, the electric motor, the diesel engine, the gasoline engine, or the combination thereof can be mounted atop the rotating platform as a part of the crusher 602.

It is to be understood that these inventions are not limited to the specific systems, devices, and/or methods disclosed unless otherwise specified, as such can, of course, vary. It is also to be understood that terminology used herein is for the purpose of describing particular aspects only and is not intended to be limiting.

Those skilled in the relevant art will recognize that many changes can be made to the aspects described, while still obtaining the beneficial results of the present inventions. It will also be apparent that some of the desired benefits of the present inventions can be obtained by selecting some of the features of the present inventions without utilizing other features. Accordingly, those who work in the art will recognize that many modifications and adaptations to the present inventions are possible and can even be desirable in certain circumstances and are a part of the present inventions. Thus, this description is provided as illustrative of the principles of the present inventions and not in limitation thereof.

As used hereby, the term "example" means "serving as an example, instance, or illustration". Any example described as an "example" is not necessarily to be construed as preferred or advantageous over other examples. Likewise, the term "examples" does not require all examples include the discussed feature, advantage, or mode of operation. Use of the terms "in one example," "an example," "in one feature," "a feature," or a combination thereof in this specification does not necessarily refer to the same feature, same example, or both. Furthermore, a particular feature, structure, or both can be combined with one or more other features, structures, or both. Moreover, at least a portion of the apparatus described hereby can be configured to perform at least a portion of a method described hereby.

It should be noted the terms "connected," "coupled," and any variant thereof, mean any connection or coupling between elements, either direct or indirect, and can encompass a presence of an intermediate element between two elements which are "connected" or "coupled" together via the intermediate element. Coupling and connection between the elements can be physical. Elements can be "connected" or "coupled" together, for example, by using one or more fasteners, and the like, as practicable. These are several non-limiting and non-exhaustive examples.

A reference using a designation such as "first," "second," and so forth does not limit either the quantity or the order of those elements. Rather, these designations are used as a convenient method of distinguishing between two or more elements or instances of an element. Thus, a reference to first and second elements does not mean only two elements can be employed, or the first element must necessarily precede the second element. Also, unless stated otherwise, a set of elements can comprise one or more elements. In addition, terminology of the form "at least one of: A, B, or C" or "one or more of A, B, or C" or "at least one of the group consisting of A, B, and C" used in the description or the claims can be interpreted as "A or B or C or any combination of these elements". For example, this terminology can include A, or B, or C, or A and B, or A and C, or A and B and C, or 2A, or 2B, or 2C, and so on.

The terminology used hereby is for the purpose of describing particular examples only and is not intended to be limiting. As used hereby, the singular forms "a," "an," and "the" include the plural forms as well, unless the context clearly indicates otherwise. In some examples provided hereby, the singular can portend the plural, where practicable. Further, the terms "comprises," "comprising," "includes," and "including," specify a presence of a feature, an integer, a step, a block, an operation, an element, a component, and the like, but do not necessarily preclude a presence or an addition of another feature, integer, step, block, operation, element, component, and the like.

It is intended that all matter contained in this description be interpreted as illustrative rather than in a limiting sense. While this disclosure describes examples, changes and modifications can be made to the examples disclosed hereby without departing from the scope defined by the appended claims. A feature from any of the provided examples can be used in combination with one another feature from any of the provided examples in accordance with the general principles described hereby. The present disclosure is not intended to be limited to the specifically disclosed examples alone.

What is claimed is:

1. A crusher, comprising:
a crusher frame;
a crusher subframe movably suspended from the crusher frame via a first length-adjustable turnbuckle;
a rotary bearing is directly fastened to the crusher subframe;
a rotatable picker shaft rotatably supported by the rotary bearing and adapted to rotate relative to the crusher subframe; and
at least one picker fastened to the rotatable picker shaft.

2. The crusher of claim 1, further comprising at least one actuator, leadscrew and nut, jackscrew, ball screw, roller screw, pneumatic cylinder, hydraulic cylinder, hoist, winch, or rack and pinion, wherein the at least one actuator, leadscrew and nut, jackscrew, ball screw, roller screw, pneumatic cylinder, hydraulic cylinder, hoist, winch, or rack and pinion is adapted to movably suspend the crusher subframe from the crusher frame.

3. The crusher of claim 2, further comprising at least one electric motor, pneumatic motor, hydraulic motor, or engine, wherein the at least one electric motor, pneumatic motor, hydraulic motor, or engine adapted to rotate the at least one leadscrew, jackscrew, ball screw, roller screw, hoist, winch, or pinion.

4. The crusher of claim 1, further comprising:
a turnbuckle mount rigidly mounted to the crusher frame; and
a mechanical articulating joint, wherein a threaded portion of the first length-adjustable turnbuckle is movably mounted to the turnbuckle mount via the mechanical articulating joint.

5. The crusher of claim 1, further comprising:
a turnbuckle mount rigidly mounted to the crusher subframe; and
a mechanical articulating joint, wherein a threaded portion of the first length-adjustable turnbuckle is movably mounted to the turnbuckle mount via the mechanical articulating joint.

6. The crusher of claim 1, further comprising:
a turnbuckle mount rigidly mounted to the crusher frame; and
a rotary bearing, wherein a threaded portion of the first length-adjustable turnbuckle is movably mounted to the turnbuckle mount via the rotary bearing.

7. The crusher of claim 1, further comprising:
a turnbuckle mount rigidly mounted to the crusher subframe; and
a rotary bearing, wherein a threaded portion of the first length-adjustable turnbuckle is movably mounted to the turnbuckle mount via the rotary bearing.

8. The crusher of claim 1, wherein the first length-adjustable turnbuckle is mounted non-orthogonally relative to at least one of the crusher frame or the crusher subframe.

9. The crusher of claim 1, further comprising a fixed-length link adapted to suspend the crusher subframe from the crusher frame, wherein a first portion of the fixed-length link is rigidly mounted to the crusher frame and a second portion of the fixed-length link is mounted to the crusher subframe via at least one of a mechanical articulating joint or a roller bearing.

10. The crusher of claim 1, further comprising a fixed-length link adapted to suspend the crusher subframe from the crusher frame, wherein a first portion of the fixed-length link is rigidly mounted to the crusher subframe and a second portion of the fixed-length link is mounted to the crusher frame via at least one of a mechanical articulating joint or a roller bearing.

11. The crusher of claim 1, further comprising a picker shaft rake having a mounting portion and a pad, wherein the mounting portion is removably fastened to the crusher subframe and the pad is located substantially near a rotatable surface of the rotatable picker shaft.

12. The crusher of claim 11, wherein two or more pickers are fastened to the rotatable picker shaft and the pad is located between the two or more pickers.

13. The crusher of claim 11, wherein the pad has at least one of a scraping edge and a chamfered edge.

14. The crusher of claim 1, further comprising:
a hopper subframe movably suspended from the crusher frame via a second length-adjustable turnbuckle; and
a flap fastened to the hopper subframe.

15. The crusher of claim 14, further comprising at least one actuator, leadscrew and nut, jackscrew, ball screw, roller screw, pneumatic cylinder, hydraulic cylinder, hoist, winch, or rack and pinion, wherein the at least one actuator, leadscrew and nut, jackscrew, ball screw, roller screw, pneumatic cylinder, hydraulic cylinder, hoist, winch, or rack and pinion is adapted to movably suspend the hopper subframe from the crusher frame.

16. The crusher of claim 15, further comprising at least one electric motor, pneumatic motor, hydraulic motor, or engine, wherein the at least one electric motor, pneumatic motor, hydraulic motor, or engine is adapted to rotate the at least one leadscrew, jackscrew, ball screw, roller screw, hoist, winch, or pinion.

17. The crusher of claim 14, further comprising:
a turnbuckle mount rigidly mounted to the crusher frame; and
a mechanical articulating joint, wherein a threaded portion of the second length-adjustable turnbuckle is movably mounted to the turnbuckle mount via the mechanical articulating joint.

18. The crusher of claim 14, further comprising:
a turnbuckle mount rigidly mounted to the hopper subframe; and
a mechanical articulating joint, wherein a threaded portion of the second length-adjustable turnbuckle is movably mounted to the turnbuckle mount via the mechanical articulating joint.

19. The crusher of claim 14, further comprising:
a turnbuckle mount rigidly mounted to the crusher frame; and
a rotary bearing, wherein a threaded portion of the second length-adjustable turnbuckle is movably mounted to the turnbuckle mount via the rotary bearing.

20. The crusher of claim 14, further comprising:
a turnbuckle mount rigidly mounted to the hopper subframe; and
a rotary bearing, wherein a threaded portion of the second length-adjustable turnbuckle is movably mounted to the turnbuckle mount via the rotary bearing.

21. The crusher of claim 14, wherein the second length-adjustable turnbuckle is mounted non-orthogonally relative to at least one of the crusher frame or the hopper subframe.

22. The crusher of claim 14, further comprising a fixed-length link adapted to suspend the hopper subframe from the crusher frame, wherein a first portion of the fixed-length link is rigidly mounted to the crusher frame and a second portion of the fixed-length link is mounted to the hopper subframe via at least one of a mechanical articulating joint or a roller bearing.

23. The crusher of claim 14, further comprising a fixed-length link adapted to suspend the hopper subframe from the crusher frame, wherein a first portion of the fixed-length link is rigidly mounted to the hopper subframe and a second portion of the fixed-length link is mounted to the crusher frame via at least one of a mechanical articulating joint or a roller bearing.

24. The crusher of claim 1, further comprising:
a rotating platform and
a tracked undercarriage,
wherein the crusher frame is rotatably mounted to the tracked undercarriage via the rotating platform.

25. The crusher of claim 1, further comprising a conveyor support apparatus configured to support a truss conveyor section of the crusher, wherein the conveyor support apparatus comprises:
a skid;
a tray defining at least four locating pin orifices; and
a support rigidly mounted between the skid and the tray; and
wherein the truss conveyor section is configured to at least one of:
transport materials to be crushed to the at least one picker; or
transport materials that have been crushed from the at least one picker.

26. The conveyor support apparatus of claim 25, wherein the skid defines a stake orifice.

27. The conveyor support apparatus of claim 25, further comprising a guard section rigidly mounted to a side of the tray and extending away from the skid.

28. The conveyor support apparatus of claim 25, further comprising a padeye fastened to the skid.

29. The conveyor support apparatus of claim 25, wherein a portion of the skid is curved away from a side of the skid that faces away from the tray.

30. The conveyor support apparatus of claim 25, wherein the truss conveyor section comprises a locating pin rigidly mounted thereto and adapted to fit, with a clearance fit, within a respective locating pin orifice in the at least four locating pin orifices.

31. The conveyor support apparatus of claim 30, wherein the truss conveyor section further defines a locking pin orifice.

32. The conveyor support apparatus of claim 31, further comprising a locking pin apparatus having a structural portion and at least two locking pins, wherein at least one locking pin of the at least two locking pins is configured to fit within a respective locking pin orifice with a clearance fit.

33. The conveyor support apparatus of claim 32, wherein at least one locking pin of the at least two locking pins is threaded and adapted to receive a nut to prevent the locking pin from leaving a respective locking pin hole.

* * * * *